D. EVANS & W. SNYDER.
GANG-EDGER.

No. 190,840. Patented May 15, 1877.

Witnesses:
Edward G. Osborn
Wm. E. Paige

Inventors:
David Evans
William Snyder
By C. W. M. Smith
Attorney

UNITED STATES PATENT OFFICE.

DAVID EVANS AND WILLIAM SNYDER, OF SALMON CREEK, CALIFORNIA.

IMPROVEMENT IN GANG-EDGERS.

Specification forming part of Letters Patent No. 190,840, dated May 15, 1877; application filed September 18, 1876.

*To all whom it may concern:*

Be it known that we, DAVID EVANS and WILLIAM SNYDER, of Salmon Creek, in the county of Humboldt and State of California, have invented an Improvement in Gang-Edgers, or setting and adjusting mechanism for gang-saws, of which the following is a specification:

Our invention relates to a means for setting and adjusting the saws in a saw-mill, so that the distance between any two saws, or between a saw and its guide or gage, shall be accurately set and determined, and the saw shall be held from moving laterally on its arbor while at work.

To this end our invention consists in the combination, construction, and arrangement of the several parts, as fully hereinafter explained.

The following description of our invention, and the manner of applying and working the same, is sufficiently full and clear to enable any one skilled in the art to make and use it, reference being had to the accompanying drawing, and the letters of reference marked thereon.

Figure 1:
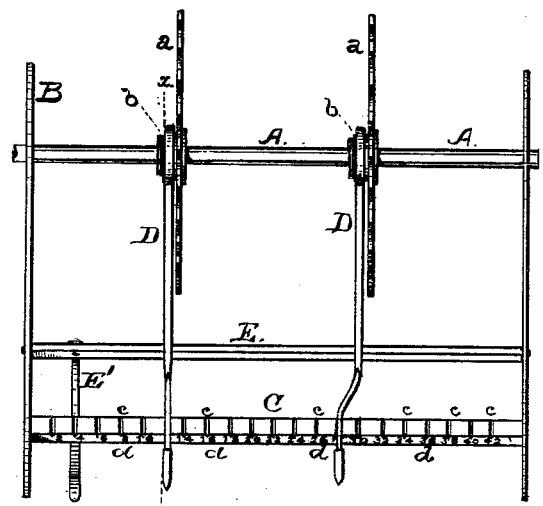
Figure 2:
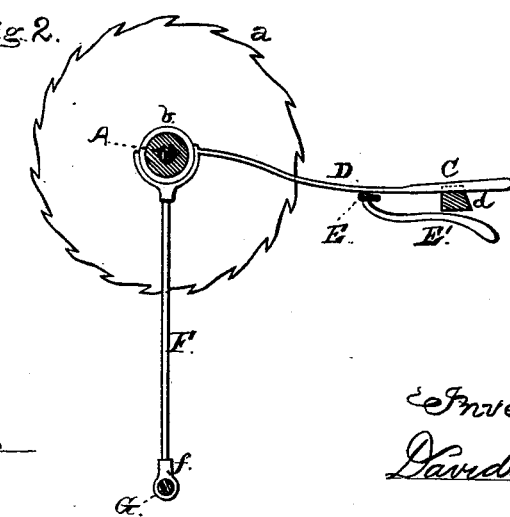

Figure 1 represents a top or plan view of the frame and arbors of a gang of circular saws having our invention applied thereto. Fig. 2 is a vertical transverse section taken through the line $x\,y$, Fig. 1.

A is the saw-arbor, and $a\,a$ the circular saws. B is the guide or gage parallel with the face of the first saw, and C is a notched beam running from the gage horizontally in front of the gage.

Each saw has a loose collar, $b$, to which is secured a bar, D, that projects in front of the saw over and upon the beam C, and rests in one of the notches $c$.

This bar D is rigidly secured to the saw-collar, and the saw is moved by means of it horizontally and laterally upon the arbor A, while it also acts in connection with the notched beam C, to hold the saw in any position toward or away from the gage, and prevent any vibration or side motion upon the arbor while at work.

The notches of the beam C are graduated according to any desired scale, and are provided with an index, $d$, so that the distance of each bar from the gage, or from its neighbor, is shown by the number or figures at the notch in which it rests, and the distance between the saws is read from the index $d$, by the position of the bars D in the notches $c$.

The index-bars D D are raised up out of the notches $c$ by means of the eccentric bar E and its lever E$'$, whenever it is desired to change the position of the saws $a\,a$ upon their arbor A, in order to regulate them for the width of timber to be produced; but any similar arrangement of mechanism to aid it lifting or moving the bars D D may be substituted without departing from the nature or purpose of our invention.

The index-bar D of the first saw is made straight, and shows upon the scale the exact distance between the fixed gage and the side of the saw; but the bar of each saw after this one is bent more or less, as shown at D$'$, Fig. 1, in order to allow for the kerf, so that the index-bar shows upon the scale the exact width of board produced by each saw without any calculation for the kerf or waste.

The vibrations or lateral motions of the saws that tend to change the distance of one saw from another, or from its gage, and thus destroy the accuracy of their work, are further controlled by means of the vertical rods F F, that are secured to the loose saw-collars $b\,b$. These rods have a sleeve, $f$, on their lower ends, working on a fixed shaft or bar, G, that extends across the frame below and parallel with the saw-arbor A.

By means of our invention, as hereinabove described, we are enabled to set and adjust the saws in a mill at any required distance from each other, or from a gage, and hold them from any lateral motion while at work.

We can thus produce any amount of lumber of exactly the same width, and of any width desired, for the bar D accurately indicates upon the scale the width of board being made, and at the same time holds the saw upon its arbor from any side play.

As thus constructed, our invention accomplishes what has not heretofore been done by similar adjusting mechanism for gang-edgers—namely, adjusting the saws to any desired width, and holding them rigidly in place while at work.

Having thus fully described our invention, what we claim as new, and desire to secure by Letters Patent, is—

1. The combination, with the arbor A and gang of saws *a a*, of the index-bars D, the eccentric bar E, and the lever E', constructed and arranged substantially as described and shown.

2. The combination, with the arbor A and gang of saws *a a*, of the shaft G, the rods F, the index-bar D, the scale or index *d*, the eccentric bar E, and lever E', all constructed and arranged substantially as described and shown.

In testimony that we claim the foregoing we have hereunto set our hands this 7th day of August, 1876.

DAVID EVANS.
WILLIAM SNYDER.

Witnesses:
    KARL E. MEYER,
    C. T. McKAY.